United States Patent [19]
Gookin et al.

[11] Patent Number: 5,115,331
[45] Date of Patent: May 19, 1992

[54] HIGH SPEED SERIAL OPTICAL CROSSBAR SWITCH

[75] Inventors: Debra M. Gookin, San Diego; Mark H. Berry, El Cajon; Markham E. Lasher, San Diego, all of Calif.

[73] Assignee: The United States of America as represented by the Secretary of the Navy, Washington, D.C.

[21] Appl. No.: 752,985

[22] Filed: Sep. 3, 1991

Related U.S. Application Data

[63] Continuation of Ser. No. 485,341, Feb. 26, 1990, abandoned.

[51] Int. Cl.$^5$ .............................. H04J 14/00
[52] U.S. Cl. ......................... 359/117; 359/139; 359/140
[58] Field of Search .................. 359/117, 139, 140

[56] References Cited

U.S. PATENT DOCUMENTS

| | | | |
|---|---|---|---|
| 3,849,604 | 11/1974 | Benes | 370/4 |
| 4,700,339 | 10/1987 | Gordon | 370/3 |
| 4,726,644 | 2/1986 | Mathias | 370/3 |

FOREIGN PATENT DOCUMENTS

| | | | |
|---|---|---|---|
| 0153838 | 7/1987 | Japan | 370/3 |
| 0195429 | 8/1989 | Japan | 370/4 |
| 0107034 | 4/1990 | Japan | 370/4 |

OTHER PUBLICATIONS

Frenkel, "Multiple Angel Tuned Etalon Filters . . . Systems", *Optics Letters*, vol. 1 #8, 1988, pp. 684–686.
Dias et al., "Fiber Optic Crossbar Switch with Broadcast Capability" *Optical Engineering*, vol. 27 #11, pp. 955–960, Nov. 1988.

*Primary Examiner*—Edward L. Coles, Sr.
*Assistant Examiner*—L. Pascal
*Attorney, Agent, or Firm*—Harvey Fendelman; Thomas Glenn Keough

[57] ABSTRACT

An optical crossbar switch includes a plurality of input integrated optical couplers connected to a star coupler at one end of an optical cable and a star coupler coupled to the other end of the optical cable connected to plurality of output integrated optical couplers. Discrete parallel optical input signals are fed to each of the input integrated optical switches and clock signals in a time division multiplexed switching sequence switch the parallel optical signals to serial form for transmission over the cable. Clock signals are connected to actuate the output integrated optical couplers in a synchronized, time division multiplexed switching sequence at GHz rates to assure the responsive transfer of a number of signals without the consequences associated with the excessive losses attendant conventional spatial light modulator interconnections.

3 Claims, 2 Drawing Sheets

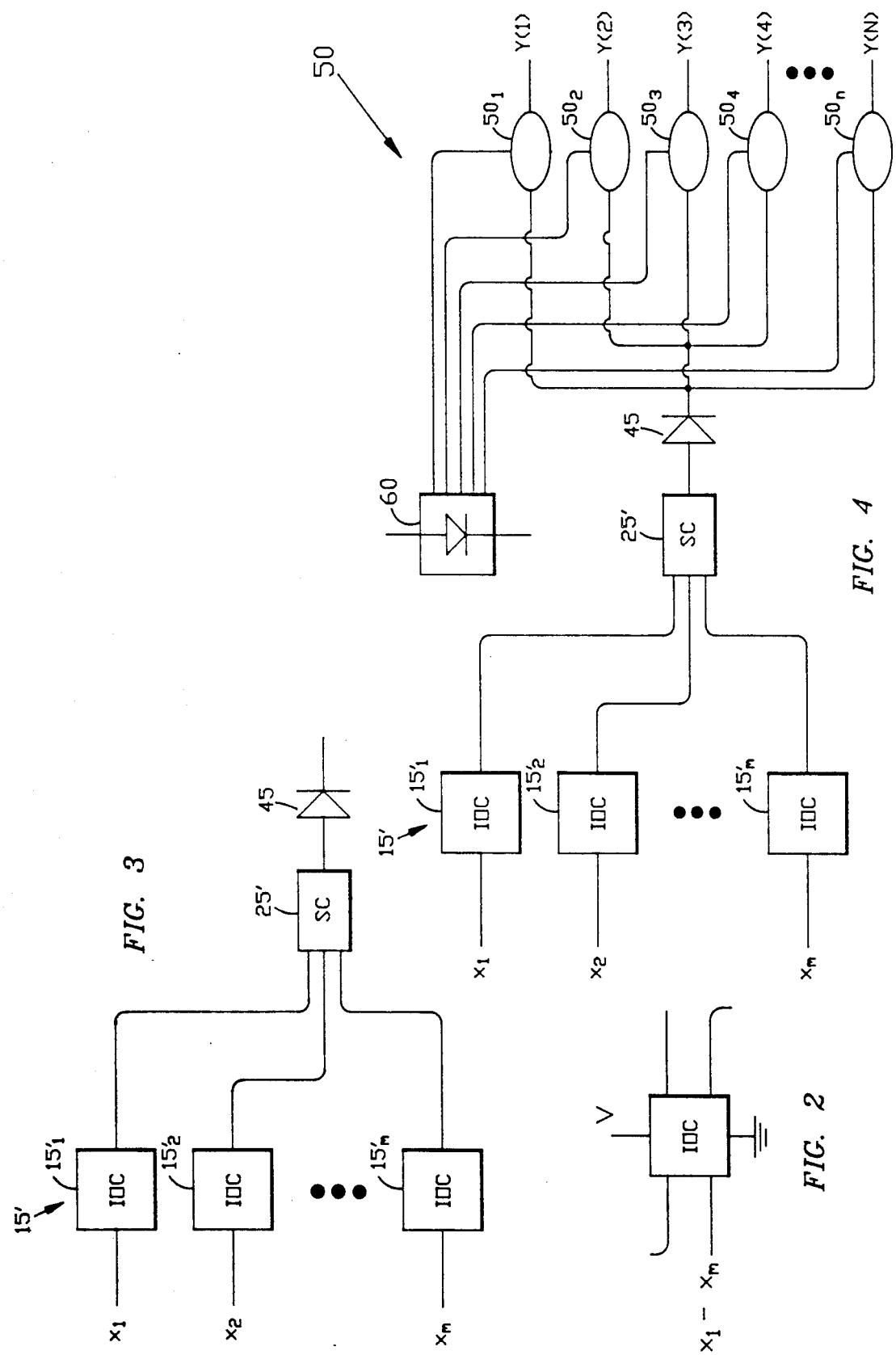

HIGH SPEED SERIAL OPTICAL CROSSBAR SWITCH

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

This application is a continuation of U.S. patent Ser. No. 07/485,341 filed Feb. 26, 1990 now abandon.

BACKGROUND OF THE INVENTION

Advanced computers and data processing applications require high-speed couplings. Although the interconnections between boards and peripherals are usually performed electronically, fiber optic processing with a variety of fiber optic interconnects now are recognized as being inherently faster and more power efficient. As a consequence, optical switching has gained acceptance for a wide variety of data transfer operations including time division multiplexing.

Many approaches to providing optical crossbar switches have been attempted and some have used a parallel configuration. Another contemporary system relies on a matrix-like interface that requires that all but one common spatial light modulator is turned off while only a single common spatial light modulator is actuated to transfer a signal of interest. An example of such a system is shown in the article "Fiber Optic Crossbar Switch with Broadcast Capability" *Optical Engineering*, Vol 27, No 11, pp 955-959, November 1988. There is some evidence to suggest that the switching times may be unduly long, about 20 microseconds, because of the intervals required to switch-on and switch-off the light modulators. The real drawback of the matrix-like interface, however, is the excessive noise which is created when the unused spatial light modulators are turned off.

Thus, there is a continuing need in the state of the art for a high speed optical switching arrangement capable of reliable time division multiplexing applications that avoids an otherwise noisy parallel architecture such as those using spatial light modulators for the time division multiplexing of the optical information signals.

SUMMARY OF THE INVENTION

The present invention is directed to providing an apparatus for a wide bandwidth, high speed optical switching of discrete data samples from one to a considerable number of inputs to one or a considerable number of outputs in specific time slots. A plurality of integrated optical couplers are connected to receive optical signals in a guided optical waveguide system including, for example, optical fibers. The integrated optical couplers are appropriately actuated by applied GHz rate clock signals from a low conduction state to a high conduction state and introduce little, if any, noise.

An object of the invention is to provide an optical data switching arrangement that reduces the problems associated with conventional switching approaches.

Another object of the invention is to provide a guided fiber optic-integrated optic switching system having a much greater bandwidth compared to an unguided system such as one which employs spatial light modulators.

Another object is to provide an optical switching system having a reduced cross talk by reason of time division multiplex switching of discrete inputs and outputs.

Another object is to provide an improved optical switching system having a reduced number of switches, fibers and associated components to improve switching rates and reduce noise.

Another object is to provide a time division multiplex optical switching of serial data to avoid the problems associated with cross talk in contemporary parallel switching systems.

These and other objects of the invention will become more readily apparent from the ensuing specification when taken in conjunction with the drawings and appended claims.

BRIEF DESCRIPTION OF THE DRAWINGS

FIG. 2 is a schematic representation of an integrated optical coupler or switch.

FIG. 3 shows an arrangement for converting optical time division multiplex data signals into representative electronic signals.

FIG. 4 shows an optical fiber to electronic crossbar switch employing photoconductive switches.

DESCRIPTION OF THE PREFERRED EMBODIMENT

Figure 1:
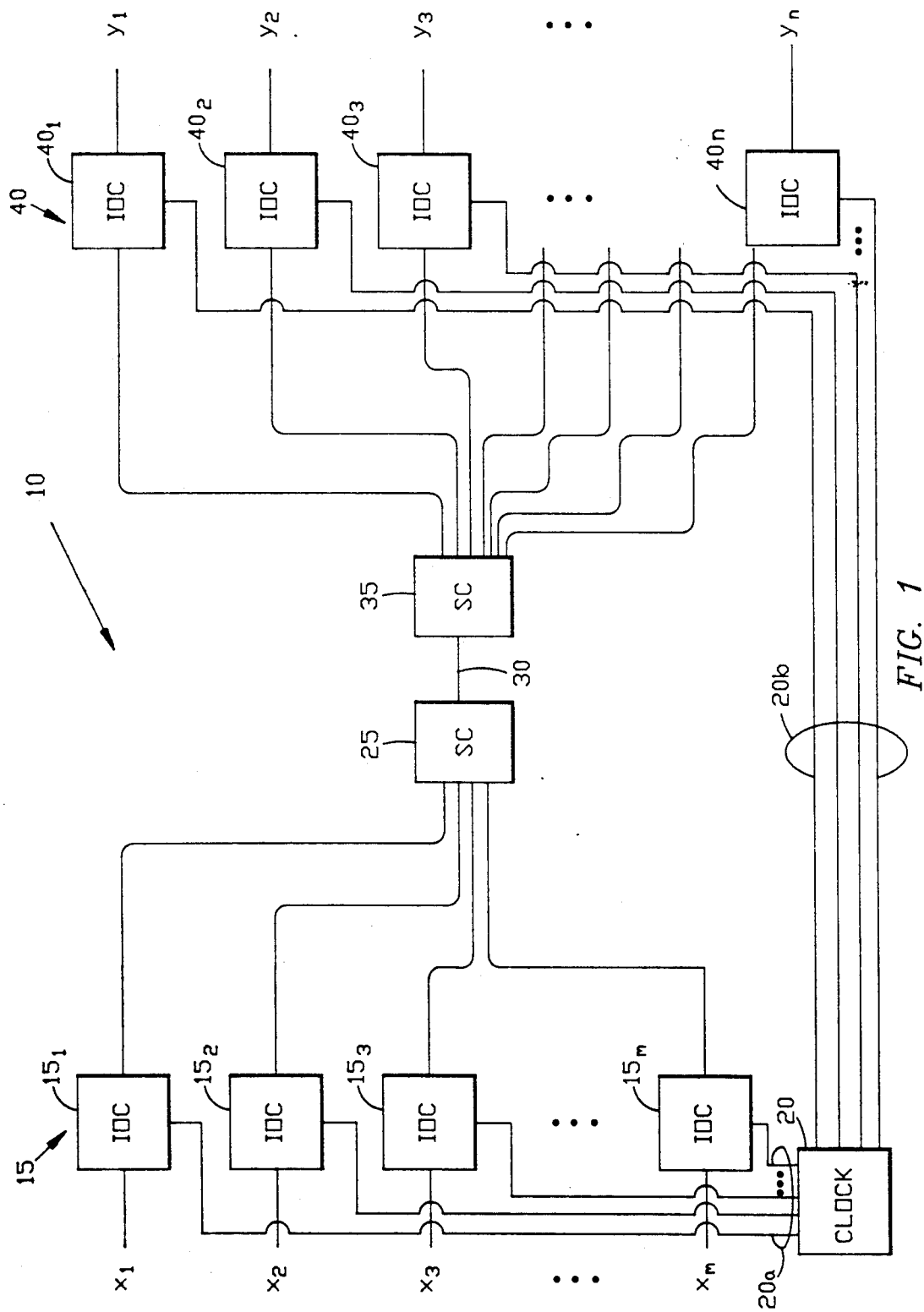
FIG. 1 is a schematic representation of a serial optical crossbar switch arrangement.

Referring now to FIG. 1 of the drawings, a serial crossbar switch 10 is fabricated to handle a number of inputted optical data signals $X_l$ through $X_m$. Each of the signals passes through a separate single mode fiber and is optically interconnected to a first set 15 of integrated optical couplers or switches that include a like number of integrated optical couplers or switches $15_l$ through $15_m$.

The optical data transmission elements referred to throughout this disclosure are most likely to be single mode 14 fibers, although multimode fibers could be selected in some data processing applications where, for example, a wide bandwidth capability may not be as critical. Optical waveguides on integrated substrates also could be used where this architecture could be advantageously employed Integrated optical couplers are well-known in the art and are commercially available from a number of sources. Typically, noting appendix A herein, an integrated optical coupler could be model Y-35-5370 or Y-35-5600 IOCs of Hoechst Celanese Advanced Photonics that are manufactured by GEC Research Ltd. of England or the OGC 2×2 Switch marketed by Crystal Technology Inc. of Palo Alto, Calif. as their Models SW385P, SW313P and SW315P although other models by other manufactures could be selected as well without departing from the scope of this inventive concept.

The specification sheet for the cited integrated optical coupler of Hoechst Celanese states that they use a Mach Zehnder travelling wave architecture and when a signal voltage is applied to the central waveguide, opposing electric fields are created across the two waveguides. In accordance with the electro-optic effect, the localized refractive indices are changed causing the optical wave to be advanced in one waveguide and retarded in the other. This is optimized, using a travelling wave electrode structure, so that the microwave and optical wave propagate together. The light is recombined in a Y junction. Waves recombining in phase are transmitted through the output waveguide while out of phase waves are transformed into a higher order mode and are lost into the substrate. The specification sheet for the integrated optical switch of Crystal Technology which also shows a Mach Zehnder travelling wave architecture says that in the absence of an externally applied electric field, $V_1$, and equal optical path lengths, light in $P_1(P_3)$ will exit the switch in $P_4(P_2)$. The switch is then in the "crossed state", . By applying $V_1$, light in $P_1(P_3)$ can be made to exit the switch at $P_2(P_4)$. The switch is then in the "straight through state" $\ominus$. Or, in other words, there would be a substantially distortionless signal throughput of the input signal when the couplers are in what may be called the maximum output level signal with an applied voltage V. There would be no storage of an incoming signal when the couplers are in what may be called the minimum output level signal, other models by other manufactures could be selected as well without departing from the scope of this inventive concept.

Other off-the-shelf integrated optical couplers might be selected which have switching rates up to 10 GHz and state-of-the-art integrated optical couplers could be chosen that have switching rates greater than 20 GHz. The integrated optical couplers of the different manufacturers all, to one degree or another, have different characteristics.

The integrated optical switches which are selected for the realization of the advantages of this inventive concept have the capability to be selectably actuated to a condition of what is called a maximum output level or a minimum output level, that is they have outputs of two possible states which are designated as a condition of maximum or minimum output. These designations are not to be construed as being absolute since greater or lesser output levels may possibly be created by other means, such as increasing or decreasing the intensity of the optical signals. These levels referred to are the levels attributed to when a designated voltage is applied. The maximum output level was found to be about 6 dB down from the input level of the optical signal, and the minimum output level is about 30-35 dB down from the magnitude of the input optical signals. The exact levels and differences could vary somewhat from these levels but must be sufficiently distinguishable to be discernable by associated processing elements.

Referring to FIG. 2 the integrated optical coupler or switch is shown to have an applied clock pulse voltage v for actuation to a maximum output state when the voltage has an applied value of 0-10 volts, depending on the particular integrated optical coupler selected. Here the incoming signal represented by $X_i$ through $X_m$ is switched through at the proper time sequence when a voltage V is applied.

Looking to FIG. 1, the integrated optical switches of set 15 are coupled to a switching control circuit or clock 20. The clock need be no more than an electronic counter which couples repetitive, sequential actuating voltage pulses over leads 20a for particular ones or all of the integrated optical switches $15_l$ through $15_m$. As such, a desired controlled actuation sequence of the integrated optical couplers is initiated by clock 20 in accordance with widely known techniques practiced those skilled in the art to which this invention pertains. Let it suffice to say, however, that a sequential time division multiplexing actuation of the switches $15_l$ through $15_m$ at GHz rates can be provided as desired in accordance with well established procedures to produce a selected switching sequence.

All the outputs of switches $15_l$ through $15_m$ are summed together incoherently by a star coupler 30. Since the several parallel inputs $X_l$ through $X_m$ are time division multiplexed in a repetitive sequence by appropriate actuation of clock 20, the data leaving star coupler 25 is in serial form and is transmitted in this form over interconnecting fiber optical cable 30.

Another star coupler 35 receives the serial data and optically connects it to each of a plurality of single mode optical fibers that terminate in a second set 40 of integrated optical couples or switches $40_l$ through $40_n$. Appropriate clock signals are coupled to these integrated optical couplers over leads 20b to actuate these integrated optical couplers to a condition of maximum output at a level 6 dB down from the input and a minimum output at about 30-35 dB down from the input.

Since the actuation sequence for these couplers is synchronized with the actuation sequence of the integrated optical couplers of first set 15, only one switch of second set 40 of integrated optical switches $40_l$ through $40_n$ is actuated simultaneously with a single switch in first set 15 so that data are transferred only when the maximum output condition is actuated in the selected ones of both sets of switches. If a different actuation sequence is desired, for example, if an optical input signal through integrated optical coupler $15_2$ is to be switched over to output several integrated optical couplers $40_1$ to $40_3$, the appropriately synchronized actuation signals would be supplied over the proper ones of leads 20a and 20b in accordance with known techniques.

Since integrated optical switches are available with switching rates of up to 10 GHz, low bandwidth signals could be sampled and switched with no loss of signal information if the total number of switches $15_m$ or $40_n$, whichever is greater, is less than the switching rate divided by twice the signal bandwidth.

Clock 20 synchronizes the actuating pulses so that a desired sequence of optical data transfers occur when discrete ones of set 15 and set 40 are actuated so that a desired sequence of parallel outputs $Y_l$ through $Y_n$ are created. All the outputs of the first set of switches 15 may be summed together incoherently by the star coupler in serial form. The second set of switches 40 is used to determine which of the n output fibers will contain the selected signal. In other words, to send an input signal $X_l$ to an output signal $Y_n$, an integrated optical coupler $15_1$ of set 15 and integrated optical coupler $40_n$ of set 40 must be simultaneously actuated so that both couplers are set for a maximum throughput while the remainder of the switches $15_2$ through $15_m$ of set 15 and $40_1$ through $40_3$ of set 40 are set for minimum throughput.

Operation of the serial optical crossbar provides for distortion-free high rate transmissions at low signal to noise ratios. Signals $X_l$ through $X_m$ may be present in respective ones of all of the inputs and all but one of the switches of set 15 are set for minimum transmission. The transmitted signal passes through star coupler 25, cable 30 and star coupler 35 to each of the set 40 of the integrated optical switches. The voltages on all of the set 40 integrated optical switches are set so that the signal passes through the appropriate output or outputs. By changing the voltages on both sets of switches in a desired switching sequence any of the $X_1$ through $X_m$ signals can be directed to any or all of the output channels as signals $Y_1$ through $Y_n$. Only a total number of switches equal to those found in the input set and the output set are required.

The arrangement of FIG. 1 is a distinct advantage over contemporary parallel spatial light modulator approaches which require a multiple of the number of switches found on the input side and the output side. The parallel approaches also require many more optical fibers and splices so that the parallel approach is prohibitively lossy and becomes very expensive. In addition, when spacial light modulators are relied upon, the switching rate of the parallel systems, or serial systems for that matter, are limited, in the neighborhood of 20 microseconds for switching.

Since those data channels, other than the actuated inputs and actuated outputs, are off, a greater reductional cross talk is assured than with the conventional parallel approaches. The guided fiber optical signal system thusly disclosed can be implemented on a substrate with waveguides between integrated optical couplers and star couplers. This configuration allows the use of a much greater bandwidth as compared to an unguided system such as one which employs spatial light modulators. Furthermore, integrating the entire arrangement further reduces the switching times and enhances the bandwidths.

FIG. 3 shows a adaptation for some applications, such as communications between computer boards. The output signals could be converted from optical to electronic and transmitted in serial form. In that case, only the set 15' connected to a clock (not shown) is needed and a set of output switches could be eliminated. A detector 45 could be placed to receive the serial signals and convert them into electronic signals.

Optionally, as shown in FIG. 4, the serial signals could be demultiplexed using photoconductive switches $50_1$ through $50_n$ which are suitably activated by a suitably actuated pulsed laser diode 60 that may itself be actuated by the same clock (not shown) as was the coupler set 15'. This feature would be useful when signals from other computer boards are brought to a particular board by an optical fiber. Then, the signals could be converted to electronic form and sent to different regions of the board.

Obviously, many modifications and variations of the present invention are possible in the light of the above teachings. It is therefore to be understood that within the scope of the appended claims the invention may be practiced otherwise than as specifically described.

APPENDIX A

18CHz INTREGATED OPTICAL AMPLITUDE MODULATORS

Features
- X Band
- Low insertion loss
- Low drive voltages
- High extinction ratio
- Temperature stable
- Separate bias/RF connections

Applications
- Microwave frequency optical links
- Analog/digital signal processing
- Optical transmission
- Coherent transmission The amplitude modulators are based on the Mach Zehnder architecture and use diffused $Ti:LiNbO_3$ waveguides. They offer high quality performance and are delivered with pigtails.

| Typical Specifications | NOTES | MODEL Y-35-8808-01 | UNITS |
|---|---|---|---|
| Operating wavelength | (1) | 1.3 | μm |
| Bandwidth | (2) | 18 | GHz |
| Extinction ratio | (3) | 25 | dB |
| Optical insertion loss | | 6 | dB |
| Optical return loss | | 14 | dB |
| Drive voltage (Vπ) | | 12 | V |
| Electrical input impedance | | 50 | ohms |
| Electrical return loss | | >10 | dB |
| Bias voltage | | ±20 | V |
| RF connector | | SMA | – |
| Bias connector | | SMB | – |
| Packaged dimensions | | 46 x 27 x 15 | mm |
| Standard fiber Input | | 2 meters York HB 1250 polarization maintaining | |
| Output | | 2 meters GPT SM08 8/125μm monomode | |
| Sheath | | 1 meter nylon sleeving | |
| Environment | | Normal laboratory conditions. | |

Notes (1) Also available for 1.5μm wavelength. Specification as above with exception of the drive voltage which is 14V. Device identification Y-35-8808-02.

(2) Electrical bandwidth ±3dB measuring using a modulated optical microwave link.

(3) Low frequency measurements.

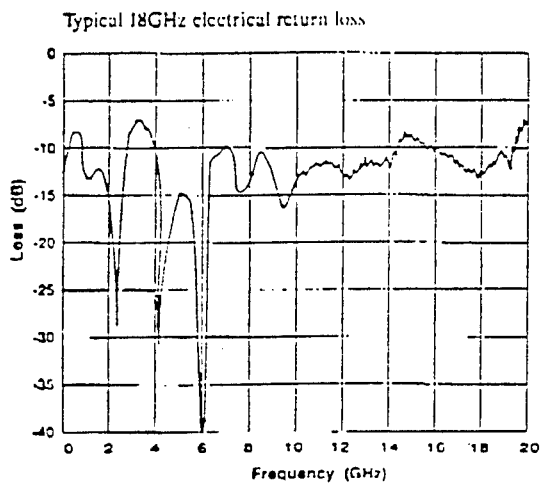

Typical 18GHz electrical return loss

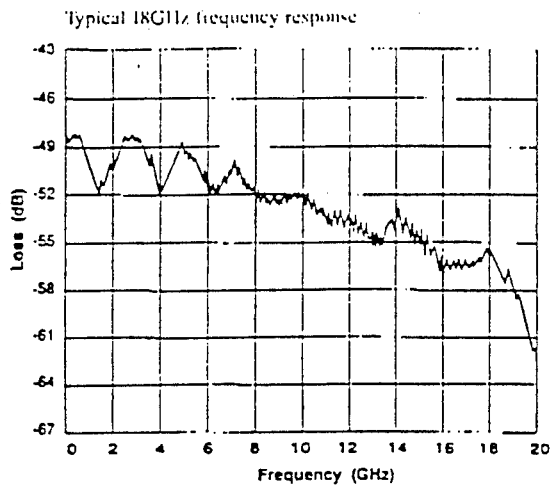

Typical 18GHz frequency response

Manufactured and distributed in Europe by GEC Advanced Optical Products

Hoechst Celanese

Hoechst

Hoechst Celanese, Advanced Photonics,
86 Morris Avenue,
Summit, NJ 07901, USA.
(908) 522-7692  (908) 522-7691
Fax (908) 522-7934

OGW 2×2 Switch
with and without fiber optic pigtails for high-speed switching of light

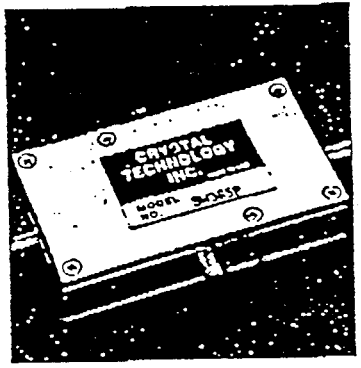

Crystal Technology, a world leader in the production of state-of-the-art Electro-Optic and Acousto-Optic devices, now offers Optical Guided-Wave (OGW) devices with and without pigtails for use in research and development environments. Crystal Technology's OGW switches are produced by diffusing precisely placed titanium waveguides into high-purity, optical lithium niobate substrates in the configuration shown in Figure 1.

On pigtailed devices, single mode, polarization-preserving optical fibers are permanently attached to the input and output faces of the device.

OPERATION

In the absence of an externally applied electric field, $V_1$, and equal optical path lengths, light in $P_1$ ($P_3$) will exit the switch in $P_4$ ($P_2$). The switch is then in the "crossed state." ⊗. By applying $V_1$, light in $P_1$ ($P_3$) can be made to exit the switch at $P_2$ ($P_4$). The switch is then in the "straight through state." ⊖.

A biasing electrode structure, $V_2$, is provided to allow tuning of the passive 3 dB couplers to the exact laser wavelength being used. This design allows the biasing electrodes to be totally independent

SPECIFICATIONS[1]

|  | Model SW385P | Model SW313P | Model SW315P |
|---|---|---|---|
| Bandwidth (Linear Small Signal) | DC to 3 GHz | DC to 3 GHz | DC to 3 GHz |
| Switching Voltage ($V_1$) | Typical 4V | Typical 8V | Typical 11V |
| On/Off Crosstalk | 20 dB min | 20 dB min | 20 dB min |
| Wavelength | 850 nm | 1300 nm | 1550 nm |
| Fiber-to-Fiber Insertion Loss[2] | < 7 dB | < 7 dB | < 7 dB |
| Electrical Input Termination | 50 ohms | 50 ohms | 50 ohms |
| Connector | SMA | SMA | SMA |
| DC Bias Voltage ($V_2$) | Adjustable, depending on exact wavelength of laser source. | | |

Notes: 1. "P" in model number indicates pigtails. Please omit when ordering devices without pigtails.
2. Devices with pigtails only.

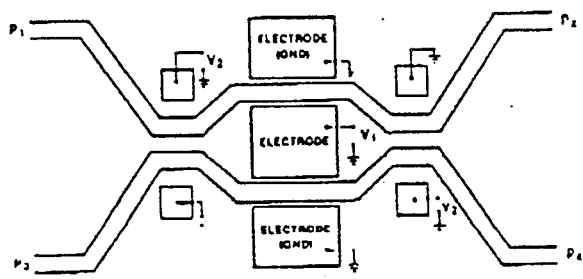

FIGURE 1. BIAS ELECTRODES ARE ELECTRICALLY CONNECTED INTERNALLY IN THE PACKAGE of the high-speed switching electrodes. The 3 dB frequency point of these modulators is 3 GHz (see Figure 3).

INTEGRATED OPTIC PRODUCTS AND SERVICES

Crystal Technology also offers standard OGW intensity and phase modulators between 850 nm and 1550 nm, as well as custom-designed products that combine power splitters, combiners, polarizers, modulators and switches on the same chip. These products service the telecommunications, instrumentation, and fiber optic sensor markets.

In addition, Crystal Technology offers the only Integrated Optic foundry service for prototype, pilot, and medium volume production.

Contact us at:

Crystal Technology, Inc.
A Siemens Company
1060 East Meadow Circle
Palo Alto, CA 94303
Telephone: (415) 856-7911, TLX 470103

Crystal Technology, Inc.

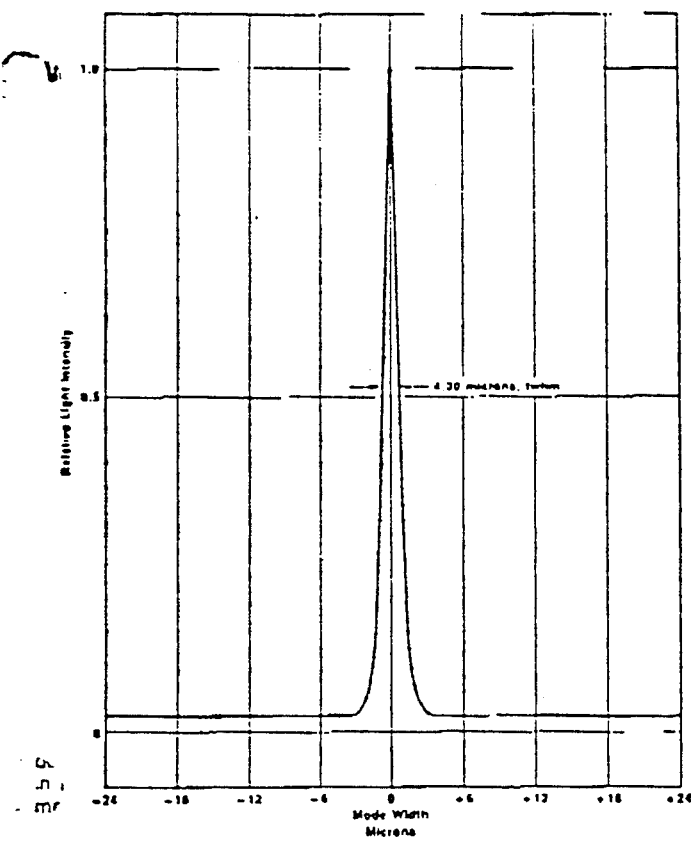

FIGURE 2. LIGHT SPOT INTENSITY PROFILE OF LN CHANNEL WAVEGUIDE (SW38SP)

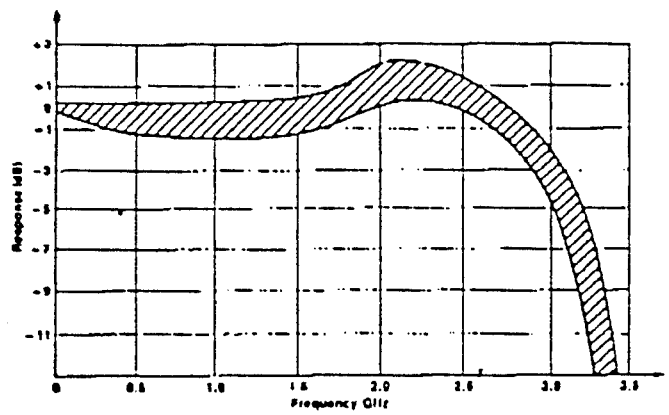

FIGURE 3. LINEAR SMALL SIGNAL FREQUENCY RESPONSE
(Maximum and Minimum Performance)

This data sheet is issued to provide outline information only and Crystal Technology, Inc. reserves the right to alter without notice the specifications, design, price or conditions of supply of that product. 3/87

Crystal Technology, Inc.

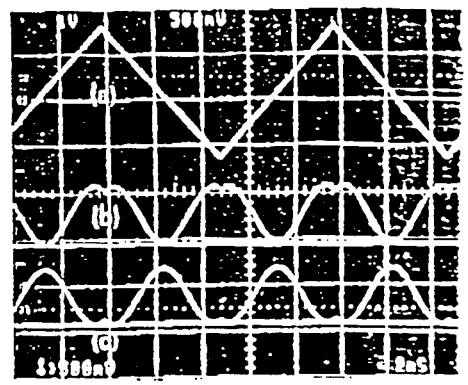

FIGURE 4. Model SW315. (a) Voltage input for switching (11.0
(b) Straight through output port =; (c) Crossed channel output port =. Flat trace is zero light level. Crosstalk both states exceeds 25 dB.

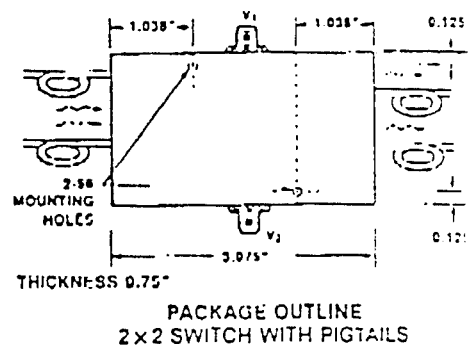

THICKNESS 0.75"

PACKAGE OUTLINE
2 × 2 SWITCH WITH PIGTAILS

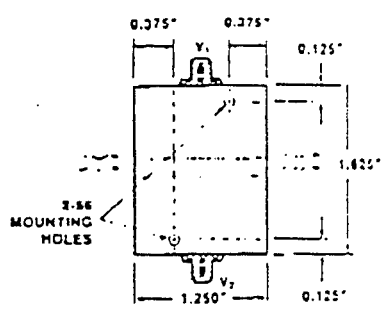

THICKNESS 0.5"

PACKAGE OUTLINE
2 × 2 SWITCH WITHOUT PIGTAILS
Guide separation is 250 microns.

Contact us at:

Crystal Technology, Inc.
A Siemens Company
1060 East Meadow Circle
Palo Alto, CA 94303
Telephone: (415) 856-7911, TLX 470103

We claim:

1. A high speed optical crossbar switch capable of handling broadband optical data signals at GHz rates comprising:

a set of input integrated optical couplers each receiving an optical data signal and having the capability to be selectably actuated by a voltage signal to produce signals representative of each said optical data signal at a maximum output level signal being a substantially distortionless signal throughput of said optical data signal or a minimum output level signal with no storage of said optical data signal, each being coupled in parallel with respect to the other input integrated optical couplers;

a first star coupler having a plurality of optical fibers each optically coupled to an integrated optical coupler to receive the maximum output level signals and minimum output level signals from a respective separate one of said input integrated optical couplers and present them as serial signals at an output;

an optical cable optically coupled to said output of said first star coupler that transmits said serial signals;

a second star couple optically coupled to said optical cable having optical fibers coupled to feed said serial signals therethrough;

a set of output integrated optical couplers each coupled to receive said serial signals from said second star coupler and having eh capability to be selectably actuated by a voltage signal to produce signals representative of each of said serial signals at a maximum output level signal being a substantially distortionless signal throughput of each said optical data signal or a minimum output level signal with no storage of each said optical data signal, each of said output integrated optical couplers being coupled in parallel with respect to the other said output integrated optical couplers a clock operatively coupled to each of said input integrated optical couplers and each of said output integrated optical couplers to provide clock voltage signals that actuate said input integrated optical couplers and said output integrated optical couplers in a time division multiplex switching sequence at rates in excess of 10 GHz.

2. A high speed optical crossbar switch capable of handling broadband optical data signals at GHz rates comprising:

a set of input integrated optical couplers each receiving an optical data signal and having the capability to be selectably actuated by a voltage signal to produce signals representative of each said optical data signal at a maximum output level signal being a substantially distortionless signal throughput of said optical data signal or a minimum output level signal with no storage of said optical data signal, each of said input integrated optical couplers being coupled in parallel with respect to the other said input integrated optical couplers;

a clock operatively coupled to each of said input integrated optical couplers to provide clock voltage signals that actuate said input integrated optical couplers in a time division multiplex switching sequence at rates in excess of 100 MHz;

a first star coupler having a plurality of optical fibers each optically coupled to an input integrated optical coupler to receive the maximum output level signals each being a substantially distortionless signal throughput of said optical data signal and minimum output level signals with no storage of each said optical data signal from a respective separate one of said input integrated optical couplers and present them as serial signals at an output; and a detector coupled to said output of said first star coupler to provide representative electrical signals of said serial signals.

3. A high speed optical crossbar switch according to claim 2 further including:

a pulsed laser diode actuated to produce pulsed enabling signals;

a set of output photoconductive switches each coupled to receive said representative signals from said detector and each disposed to receive said pulsed enabling signals from said pulsed laser diode having the capability to be selectably actuated by said pulsed enabling signals to produce representative electrical signals of said serial signals in accordance with a time division multiplex switching sequence, each being coupled in parallel with respect to the other output photoconductive switches to produce representative parallel optical output signals.

* * * * *